United States Patent [19]
Burgdorf et al.

[11] Patent Number: 5,819,193
[45] Date of Patent: Oct. 6, 1998

[54] CIRCUIT ARRANGEMENT FOR CONDITIONING AND EVALUATING WHEEL SENSOR SIGNALS

[75] Inventors: Jochen Burgdorf, Offenbach; Helmut Fennel, Bad Soden, both of Germany

[73] Assignee: ITT Automotive Europe GmbH, Frankfurt, Germany

[21] Appl. No.: 545,824

[22] PCT Filed: Apr. 22, 1994

[86] PCT No.: PCT/EP94/01254

§ 371 Date: Nov. 2, 1995

§ 102(e) Date: Nov. 2, 1995

[87] PCT Pub. No.: WO94/25319

PCT Pub. Date: Nov. 10, 1994

[30] Foreign Application Priority Data

May 3, 1993 [DE] Germany .......................... 43 14 449.7

[51] Int. Cl.$^6$ .................................................. B60T 8/32
[52] U.S. Cl. ................. 701/76; 701/74; 701/75; 701/82; 303/122.08; 303/134; 303/173
[58] Field of Search ..................... 364/426.016, 426.018, 364/426.019, 426.024, 426.027, 565; 303/139, 122.08, 168, 173, 174; 180/197

[56] References Cited

U.S. PATENT DOCUMENTS

| | | | |
|---|---|---|---|
| 4,729,608 | 3/1988 | Fennel et al. | 303/190 |
| 4,844,557 | 7/1989 | Giers | 364/426.016 |
| 5,179,526 | 1/1993 | Zimmer et al. | 364/426.015 |
| 5,269,390 | 12/1993 | Glover et al. | 180/197 |
| 5,270,933 | 12/1993 | Fennel et al. | 364/426.018 |
| 5,329,805 | 7/1994 | Yahagi et al. | 73/9 |
| 5,451,867 | 9/1995 | Loreck et al. | 364/565 |

FOREIGN PATENT DOCUMENTS

| | | |
|---|---|---|
| 0 034 839 | 9/1981 | European Pat. Off. . |
| 3 644 263 | 7/1987 | Germany . |
| 3 803 908 | 8/1988 | Germany . |
| 3 742 244 | 4/1989 | Germany . |
| 3 903 071 | 8/1989 | Germany . |
| 3 812 904 | 9/1989 | Germany . |
| 3 923 782 | 1/1990 | Germany . |
| 4 002 035 | 8/1990 | Germany . |
| 3 917 976 | 12/1990 | Germany . |
| 4 111 515 | 10/1991 | Germany . |
| 4 122 484 | 1/1993 | Germany . |
| 417 774 | 7/1974 | U.S.S.R. . |
| 433 453 | 12/1974 | U.S.S.R. . |
| 545 973 | 3/1977 | U.S.S.R. . |

OTHER PUBLICATIONS

English translation (marked "A") filed in U.S. application No. 08/178,300.

*Primary Examiner*—Tan Q. Nguyen
*Attorney, Agent, or Firm*—Thomas N. Twomey; J. Gordon Lewis

[57] ABSTRACT

A circuit arrangement for conditioning and evaluating the signals emanating from wheel sensors in a first stage determines the sensor(s) supplying the highest useful signal at very low wheel speeds. The signal from the most sensitive sensor is delivered when the wheel speed is below the predetermined speed threshold. Above the speed threshold, however, the signal from a sensor arranged on a driven vehicle wheel is used as the vehicle speed signal. The circuit is especially suitable for anti-lock and traction slip control systems which supply speed signals which can also be evaluated for other vehicle control or regulating systems.

20 Claims, 1 Drawing Sheet

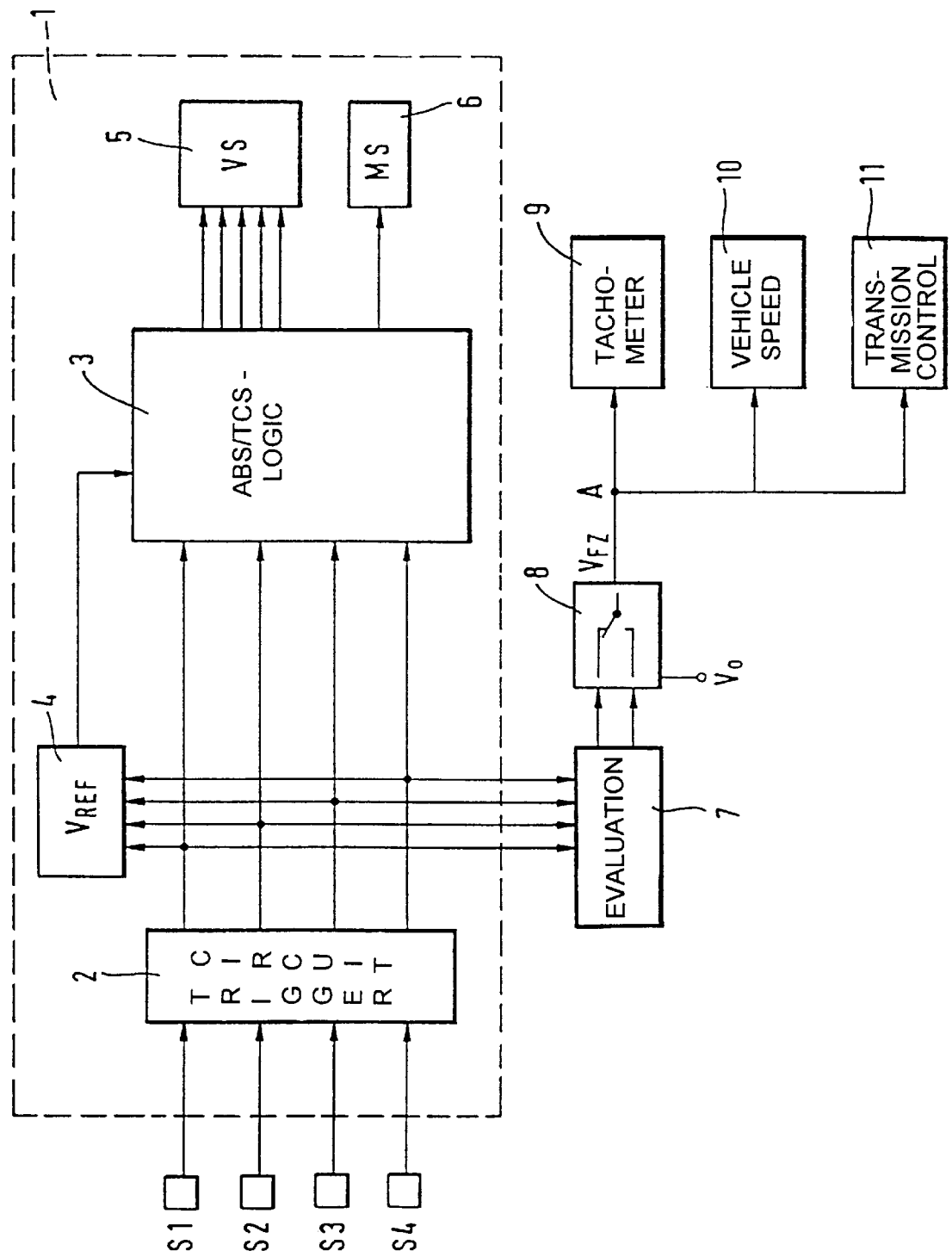

CIRCUIT ARRANGEMENT FOR CONDITIONING AND EVALUATING WHEEL SENSOR SIGNALS

This application is the U.S. national-phase application of PCT International Application No. PCT/EP94/01254.

BACKGROUND OF THE INVENTION

The present invention relates to a circuit arrangement for conditioning and evaluating sensor signals representative of the rotational behavior of the individual wheels of a vehicle and for generating a signal indicative of the vehicle speed. More particularly, this circuit arrangement can be used in anti-lock or traction slip control systems, which supply speed signals which can also be evaluated for other vehicle control or regulating systems.

Automotive vehicles are increasingly equipped with electronic regulating and control systems of different types. Sensors are an important component part of these systems. It is known to use wheel sensors for anti-lock systems (ABS) and for traction slip control (TCS) which furnish electric signals representing the rotational behavior of the controlled wheels. The rotational behavior of the individual wheels permits determining the vehicle speed, cornering or driving straight or other data related to vehicle dynamics. The quality of the sensors, above all the measuring accuracy in various speed ranges (very low speeds are particularly critical), the magnitude of the useful signal, the reliability of the sensors and also the complexity of manufacture have a major influence on the quality and price of the control systems in practice.

The speed information obtained by way of the wheel sensors as control quantities is also required for other control and regulating systems in automotive vehicles, for example, for engine control, transmission control, for driving speed controllers, for electronic speedometers and mileage meters, etc. However, the requirements of the different systems placed on the speed signals vary. For example, measuring the speed near zero is absolutely necessary for some systems, while the lower speed range is of little, if any, interest in an anti-lock system.

For vehicles having a plurality of control or regulating systems, development objectives aim at data exchange by way of communication networks, to the effect of economizing sensors, line connections, plugs, etc., by multiple use.

In case of multiple use of speed signals, on the one hand, speeds close to zero must be measured, while, on the other hand, spinning of the driven vehicle wheels should be visible on the electronic speedometer, for example.

Another difficulty is that it is frequently not possible in practical operations, for reasons of construction and due to the necessary manufacturing effort, to equip all vehicle wheels, in particular the driven and the non-driven wheels, with the same type of sensors. Therefore, the amount of the useful signal of these sensors in dependence on speed is generally different, and the problem becomes greater by inevitable manufacturing and assembling tolerances. Thus, the demand for a highest possible useful signal in the speed range proximate zero and after display of the speed of the driven wheels on the speedometer is a contradiction in practical operations because frequently the non-driven wheels must be equipped with more sensitive sensors.

SUMMARY OF THE INVENTION

It is an object of the present invention to overcome the difficulty described above.

It has been discovered that this object can be achieved by a circuit arrangement in which initially automatically the highest useful signal supplied by the sensors at very low wheel speeds, i.e. at wheel speeds proximate zero and below a predetermined speed threshold is delivered as the vehicle speed signal, while above this speed threshold the signal of a sensor arranged on a driven vehicle wheel serves as a speed signal.

When using the circuit arrangement according to the present invention, it is insignificant whether wheel sensors of equal type are provided or whether, for example, particularly high-quality sensors are mounted on one or on both of the non-driven wheels which furnish a useful signal even at very low speeds. Because the amplitude of the useful signal rises proportional to the wheel speed in conventional wheel sensors, generally it is not difficult to evaluate the output signal of the sensor in the higher speed range, for example, above the predetermined speed threshold.

According to a favorable embodiment of the present invention, the sensor supplying the highest useful signal at low wheel speeds is determined constantly or on each start of the vehicle. It is also possible to carry out this selection during manufacture of the vehicles, for example, during the final check on the assembly line, or in the repair shop after each vehicle maintenance or repair operation.

The predetermined speed threshold ranges preferably (depending on the vehicle type or sensor construction) between 5 and 20 km/h, more particularly between 8 and 12 km/h.

Further features, advantages and possible applications of the present invention can be taken from the following description of further details by way of the accompanying drawing of an embodiment.

BRIEF DESCRIPTION OF THE DRAWING

The single FIGURE is a schematically simplified view of a circuit arrangement according to the present invention.

DETAILED DESCRIPTION OF THE INVENTION

The electronic part of an anti-lock and traction slip control system 1 is shown in the illustrated embodiment. This anti-lock system (ABS) and traction slip control system (TCS) comprises wheel sensors S1 to S4 which typically are inductive transducers. Wheel sensors S1 to S4 are known to be arranged on a toothed disc rotating with the vehicle wheel and supply an alternating signal, the frequency of which is proportional to the rotational speed of the wheel or the toothed disc. Because with such known sensors variations in the magnetic field in the inductive transducers or sensors S1 to S4 are caused by rotations, the amplitude of the output signal is generally proportional to the wheel speed. Thus, at low wheel speeds, the useful signal becomes very low and is in the order of the inevitable spurious signals. By special constructions, accurate manufacture and exact adjustment of the air gap, namely by considerable effort and equipment, a sufficient useful signal is still provided even at very low wheel speeds.

The output signals of the wheel sensors S1 to S4 are conditioned in a trigger circuit 2. In the embodiment described herein, a pulse train proportional to the wheel speed or the wheel rotational behavior is produced which subsequently can be evaluated in an ABS/TCS logic 3 for generating braking pressure control signals. A so-called vehicle reference speed $V_{REF}$ is formed in a circuit 4 by comparing the pulse trains or the rotational behavior of the individual wheels. By comparing the pulse trains derived from the individual wheels or the individual sensors S1 to S4 with the vehicle reference speed $V_{REF}$, the operation times of the hydraulic valves (not shown) are determined which eventually modulate the braking pressure in the desired manner. A valve control has been designated by reference numeral 5 in the drawing. Another circuit block 6 represents an engine control system, by way of which traction torque management of the vehicle engine is performed during traction slip control operations.

According to the present invention, the speed signals $V_{FZ}$, conditioned in the trigger 2 of the ABS/TCS circuit 1, are provided at an output A by way of an evaluation circuit 7 and a change-over switch 8 and, thus, are furnished to an electronic speedometer and other control or regulating systems of the automotive vehicle. A terminal of the change-over switch 8, referred to as "$V_o$", represents the definition of a speed threshold. Below this speed threshold, i.e. at speeds proximate zero km/h, the signal of that wheel sensor which, due to its construction and/or favorable tolerances, furnishes the highest useful signal, is delivered through the change-over switch 8. Above the speed threshold $V_o$, however, the conditioned signal $V_{FZ}$ of a sensor mounted on a driven wheel is provided at the output A of the change-over switch 8.

An electronic tachometer 9, a driving speed controller 10 and a transmission control unit 11 are represented symbolically in the drawing as consumers for the speed signal $V_{FZ}$ delivered according to the present invention.

To determine that sensor of wheel sensors S1 to S4 which supplies the highest useful signal at low speeds, the expert in the art may choose among several methods. For example, it is possible, by way of a microprocessor, to associate the signal level of the individual sensors with a determined wheel speed and to thereby calculate the voltage output of the sensor element as a function of speed. This action can be performed, for example, by a microcomputer which is already required for anti-lock control (ABS) or traction slip control (TCS) operations. No additional equipment is necessary apart from changes in the software. Another advantage of this method is that this selection operation is repeated automatically during each starting operation.

On the other hand, it is also possible to determine the most sensitive sensor during the final of the vehicle on the assembly line and to store this information in a memory associated with the ABS/TCS controller. During maintenance or repair operations, a test should be conducted to determine whether the same sensor, as previously established, supplies the highest useful signal.

Above the predetermined speed threshold $V_o$ of 10 km/h, for example, switch 8 ensures that the sensor signal emanating from a driven wheel is delivered as a speed signal $V_{FZ}$. Thus, the tachometer 9 will visually signal the "spinning" of a driven wheel. This is a frequent requirement.

We claim:

1. A circuit arrangement for conditioning and evaluating sensor signals representative of the rotational behavior of the individual wheels of a vehicle and for generating a signal representative of the vehicle speed for use in anti-lock or traction slip control systems which supply speed signals which can also be evaluated for other vehicle control or regulating systems, characterized in that:

(a) below a predetermined speed threshold the highest useful signal of the signals developed by sensors associated with the individual wheels of a vehicle and representative of the rotational behavior of the individual wheels is determined and delivered as a vehicle speed signal, and (b) above said speed threshold a signal of a sensor arranged on a driven vehicle wheel is delivered as a vehicle speed signal.

2. A circuit arrangement as claimed in claim 1, characterized in that the sensor supplying the highest useful signal below said predetermined speed threshold is determined constantly or during each starting operation of the vehicle.

3. A circuit arrangement as claimed in claim 1, characterized in that the sensor supplying the highest useful signal below said predetermined speed threshold is determined during manufacture of the vehicles and is defined as being decisive for the output of the vehicle speed signal in the speed range below said predetermined speed threshold.

4. A circuit arrangement as claimed in claim 3, characterized in that the sensor supplying the highest useful signal below said predetermined speed threshold is again detected and determined during each vehicle maintenance or repair operation.

5. A circuit arrangement as claimed in claim 1, characterized in that a speed value ranging between 5 and 20 km/h is predetermined as the speed threshold.

6. A circuit arrangement as claimed in claim 5 characterized in that a speed value between 8 and 12 km/h is predetermined as the speed threshold.

7. A circuit arrangement for conditioning and evaluating sensor signals representative of the rotational behavior of the individual wheels of a vehicle and for generating a signal indicative of the vehicle speed, said circuit arrangement comprising:

a plurality of sensors for individually supplying speed signals representative of the rotational behavior of individual wheels of a vehicle;

means for supplying a threshold signal representative of a predetermined speed threshold;

means for determining which of said sensors supplies the highest useful signal of said speed signals;

and means for selecting between said highest useful signal of said speed signals when below said threshold signal and a speed signal supplied from a sensor associated with a driven wheel when above said threshold signal.

8. A circuit arrangement according to claim 7 wherein said sensor supplying the highest useful signal is determined constantly.

9. A circuit arrangement according to claim 7 wherein said sensor supplying the highest useful signal is determined during each starting operation of the vehicle.

10. A circuit arrangement according to claim 7 wherein the sensor supplying the highest useful signal is determined during manufacture of the vehicles.

11. A circuit arrangement according to claim 10 wherein the sensor supplying the highest useful signal is detected and again determined during each vehicle maintenance or repair operation.

12. A circuit arrangement according to claim 7 wherein said predetermined speed threshold is between 5 and 20 km/h.

13. A circuit arrangement according to claim 12 wherein said predetermined speed threshold is between 8 and 12 km/h.

14. A method for conditioning and evaluating sensor signals representative of the rotational behavior of the individual wheels of a vehicle and for generating a signal indicative of the vehicle speed, said method comprising the steps of:

developing indications of the rotational behavior of individual wheels of a vehicle;

establishing a speed threshold;

determining which of said indications is the strongest;

and selecting between said strongest indication when below said speed threshold and an indication of the rotational behavior of a driven wheel when above said speed threshold.

15. A method according to claim 14 wherein said strongest indication is determined constantly while the vehicle is in operation.

16. A method according to claim 14 wherein said strongest indication is determined during each starting operation of the vehicle.

17. A method according to claim 14 wherein said strongest indication is determined during manufacture of the vehicles.

18. A method according to claim 17 wherein said strongest indication is detected and again determined during each vehicle maintenance or repaid operation.

19. A method according to claim 14 wherein said speed threshold is between 5 and 20 km/h.

20. A method according to claim 19 wherein said speed threshold is between 8 and 12 km/h.

* * * * *